INVENTOR.
Helmut Martin

3,479,621
FORM STABILIZED WAVE GUIDES
Helmut Martin, Hannover, Germany, assignor to Kabel- und Metallwerke Gutehoffnungshutte Aktiengesellschaft, Hannover, Germany
Filed May 29, 1967, Ser. No. 642,024
Int. Cl. H01p 3/12
U.S. Cl. 333—95         4 Claims

ABSTRACT OF THE DISCLOSURE

Wave guide constructions having form stability to avoid discontinuities including bends and the like, to eliminate undesired wave modes in use.

Background of the invention

The $H_{01}$ mode is ideally suited for wave guides of circular cross section, which are used in long range communication because of its very low attenuation with decreasing wave lengths. In order to obtain such low attenuation, the ratio of operating wavelength with respect to the cut-off wavelength, and the diameter of the wave guide tube should be kept at a minimum. This makes possible, however, the propagation of wave modes of shorter cut-off wavelengths, in addition to the $H_{01}$ wave and wave modes of higher cut-off wavelengths. Under normal conditions the $H_{01}$ wave would be strongly attenuated, due to the fact that other wave modes exhibit considerable attenuation and because their energy would be drawn from the $H_{01}$ wave.

The occurrence of undesired wave modes arises mainly because of wave guide discontinuities such as bends, non-uniform tube diameters, and the like. One is therefore concerned that the wave guides of circular cross section shall have high transverse and longitudinal stability as to form, in addition to the maintenance of close tolerances.

Known procedures arrive at required close tolerances through complicated reworking of the drawn tubes when made of a single layer of metal. Tubes made of multi-layers of metal are also known, and such tubes must be reworked after installation, to attain the desired tolerances. Such tube constructions have the disadvantages of complicated manufacturing procedures and lack of form stability when bent.

An object of this invention is to provide circular wave-guides for long-range communication, which are multilayer constructions showing high transverse rigidity.

A further object of this invention is to provide improved waveguide constructions of circular cross section which are armored in a manner to provide for form stability.

Other objects of this invention will in part be obvious and in part hereinafter pointed out.

Summary of the invention

The invention relates to wave guide constructions of circular cross section which include means for increasing the rigidity thereof, to thereby avoid the occurrence of undesired wave modes.

Description of the preferred embodiments

Figure 1:
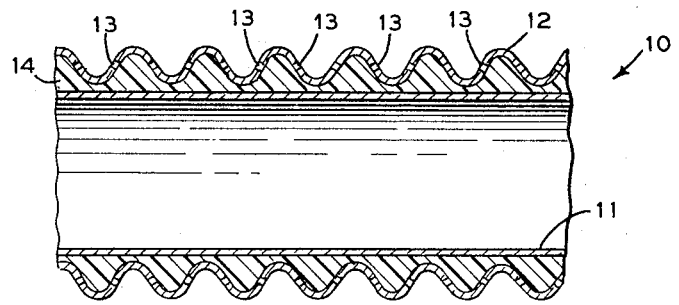
FIG. 1 is a longitudinal sectional view showing a wave guide construction embodying the invention.

As shown in FIG. 1, 10 designates a wave guide construction embodying the invention. The same comprises a wave guide tube 11 of circular cross section, which is formed of copper or aluminum. The tube 11 is located within an outer corrugated tubing 12 which may be formed of steel or the like. Tubing 12 is formed with vent openings 13 along the length thereof.

A plastic layer 14 is interposed between tube 11 and tubing 12 and fills the space therebetween; the vent openings 13 allowing excess plastic to escape therefrom during the fabricating procedures involved. Preferably the plastic layer 14 is derived from a synthetic resin having a temperature expansion coefficient substantially equal to that of said tubular members, such as epoxy, aminoplast, polyester or phenolic resins. Various thermoplastic resins including polyethylene or the like, may also be used. Considering the temperature coefficients involved, polystyrene, polyvinyl chloride, and the fluoro resins such as polychlorotrifluoroethylene and polytetrafluoroethylene, may also be used.

The waveguide construction shown may be made by alternative procedures. In one method, a flat metal strip is preperforated to provide vent openings 13 therein; the strip being progressively formed into tubular form with a V-shaped opening. During this tube forming process, the wave guide tube 11 and plastic 14 are introduced into the tube being formed and the longitudinal joint in the formed tube is closed by welding or the like.

The resultant assembly of inner waveguide tube 11, interlayer of plastic 14 and the outer tubular covering is then passed through corrugating means which forms the transverse corrugations in said outer tubular covering, which also causes the excess of plastic 14 which is applied in a viscous state, to pass outwardly by wave of vent openings 13 in the corrugated tube 12. The inner wave guide tube 11 is calibrated by forcing a metal ball through the tube to thereby accurately true up the diameter of tube 11; such calibrating operation taking place while the plastic 14 is in a viscous state and any excess thereof accruing from the calibrating operation, passing outwardly of vent openings 13. The hot, viscous resin is then allowed to cool and solidify, thereby completing the wave guide construction 10.

Alternatively, the outer tubing 12 is precorrugated and perforated as at 13. The inner tube 11 is inserted together with hot viscous plastic into outer tubing 12. An evacuation system is operatively connected to the vent openings 13 in outer tube 12, so as to draw the plastic into the valley portions of the outer tube 12; additional plastic being forced in at the opposite ends of the assembled tubes 11, 12. Thereafter, the inner tube 11 is calibrated as above described, followed by cooling and solidifying the resin 14.

Figure 2:
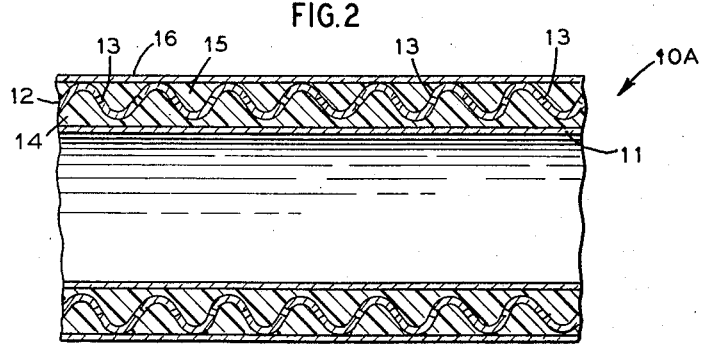
FIG. 2 is a view similar to that of FIG. 1, showing another embodiment of the invention.

Increased transverse and longitudinal rigidity for the wave guide tube 11 may be provided, as shown in FIG. 2. Here, the assembly of inner tube 11, corrugated tube 12 and interlayer 14 of plastic, is further provided with an outer tubular covering 16 which may be formed of copper or a corrosion resistant alloy. The covering 16 may have an inner diameter equal to the outer diameter of corrugated tubing 12 at the peaks thereof, as shown in FIG. 2, or may be somewhat greater. In any case, additional plastic 15 fills the space between corrugated tubing 12 and outer covering 16, to further rigidify the wave guide construction 10A. The covering 16 may also be made of a plastic material such as polyethylene or the like.

Preferably, the plastic material forming the interlayers 14, 15 have an expansion coefficient similar to that of the metal tubes.

As various changes might be made in the herein disclosed embodiments of the invention without departing from the spirit thereof, it is understood that all matter herein shown or described shall be deemed illustrative

What is claimed is:
1. A waveguide comprising a tubular wave guide member, a tubular protective member for said wave guide member, said protective member having transverse corrugations, said waveguide member being disposed within said protective member and in concentric relation thereto, and a body of solid synthetic resin material disposed in the annular space between said tubular members and filling the entire space between said members whereby said tubular protective member is maintained in rigid protective relation to said wave guide member, said synthetic resin material having a temperature expansion coefficient substantially equal to that of said tubular members.

2. A wave guide as in claim 1 wherein the wall of said tubular protective member is formed with spaced perforations along the longitudinal extent thereof, and said body of synthetic resin material includes portions extending into the perforations in said tubular protective member.

3. A wave guide as in claim 2 wherein said tubular members are of circular cross section.

4. A wave guide as in claim 1 and further including a second tubular protective member disposed outwardly of said first tubular protective member and in concentric relation thereto, and a second body of synthetic resin material disposed in the annular space between said first and second tubular protective members and filling the entire space therebetween.

References Cited
UNITED STATES PATENTS

| | | | |
|---|---|---|---|
| 1,049,544 | 1/1913 | Smith | 138—140 |
| 2,908,746 | 10/1959 | Fairhurst | 333—31 |

HERMAN KARL SAALBACH, Primary Examiner

L. ALLAHUT, Assistant Examiner

U.S. Cl. X.R.
138—140, 143